FIG. I

INVENTORS
CORNELIS VERWEY
PIETER J. SCHOENMAKERS
BY *Oswald H. Milmore*
THEIR ATTORNEY Jan. 19, 1960 C. VERWEY ET AL 2,921,818
ENGAGING FLUIDIZED SOLIDS FOR PNEUMATIC TRANSPORT
Filed Jan. 23, 1956 4 Sheets-Sheet 2

INVENTORS
CORNELIS VERWEY
PIETER J. SCHOENMAKERS
BY *Oswald H. Wilmore*
THEIR ATTORNEY

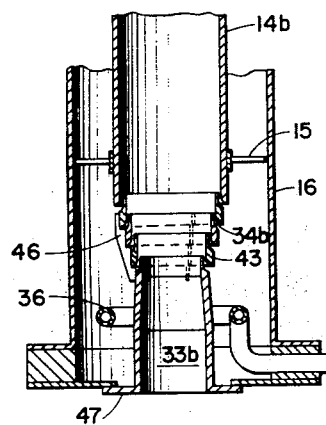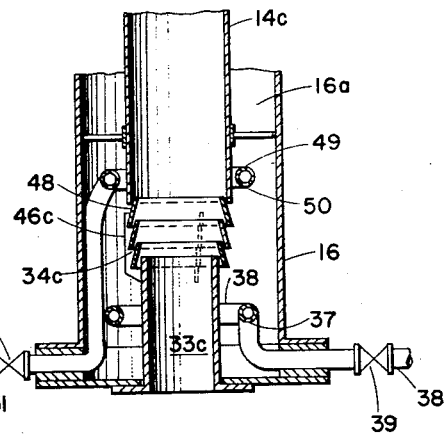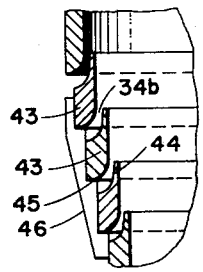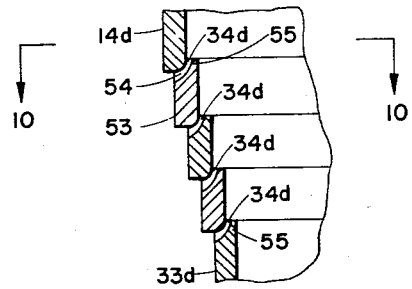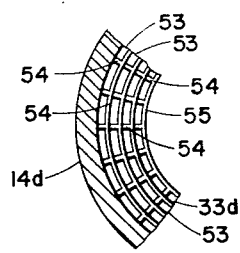

INVENTORS:
CORNELIS VERWEY
PIETER J. SCHOENMAKERS

THEIR ATTORNEY

United States Patent Office 2,921,818
Patented Jan. 19, 1960

2,921,818

ENGAGING FLUIDIZED SOLIDS FOR PNEUMATIC TRANSPORT

Cornelis Verwey and Pieter J. Schoenmakers, Delft, Netherlands, assignors to Shell Development Company, New York, N.Y., a corporation of Delaware Application January 23, 1956, Serial No. 560,802

Claims priority, application Netherlands January 27, 1955

17 Claims. (Cl. 302—53)

The invention relates to a method of and apparatus for engaging finely divided solids, such as catalyst, sand, or other granular or pulverulent materials, in a transport gas stream for pneumatic transport through a vertical, inclined or horizontal transport duct, the term "gas" being used generically herein to include vapors, such as hydrocarbon vapors that may undergo a chemical change upon being brought into contact at a suitable temperature with such solids, as well as steam, air, nitrogen, hot combustion products, or the like.

The need for such transport frequently arises in apparatus in which chemical conversions occur while the reactant gas is ascending through a transport duct together with the finely divided solids, or where the solids are moved between units of a plant, e.g., between a catalytic reactor and regenerator. (See the U.S. patent to Ewell, 2,663,675.) It arises also when heat-retentive solids, such as sand, is used to transfer heat to or abstract heat from a tube or wall bounding a space containing a medium to be heated or cooled; in this case the granular material is, for example, first heated in a hot gas stream which constitutes the solids-conveying gas stream, and afterwards gives off heat by flow in the fluidized state in contact with a nest of tubes through which a medium to be heated circulates. (See the U.S. patent to Schoenmakers et al., No. 2,698,171.)

As is disclosed in the aforesaid patent to Schoenmakers et al., the finely divided solids can be advantageously charged into the solids-conveying or transport gas stream by flowing the solids in the fluidized state into the stream at the sides thereof from an annular bed of such solids which is maintained in the fluidized state within a chamber or lift pot surrounding the said gas stream. To prevent the solids from falling through the ascending gas stream the velocity of the latter must be above a certain minimum value at the level at which the solids enter the stream. As the solids were supplied to the transport gas stream in the form of separate streams, serious erosion of the transport duct has occurred, particularly at the parts thereof immediately downstream from the point at which the solids are entrained.

Another difficulty, encountered particularly when solids at high temperatures are dealt with, is that of controlling the rate at which such solids are charged into the transport gas stream. Because the use of mechanical valves is difficult or impracticable in such cases, techniques involving control of the degree of fluidization of the solids for regulating the flow rate of the solids have been used; these, however, have necessitated the use of fluidization chambers in addition to the feed chamber from which the solids are charged into the transport duct or have not permitted complete control of the flow rate.

The object of the invention is to provide an improved method and apparatus for charging finely divided solids into a stream of transport gas in such a way that the solids are uniformly mixed with the transport gas and erosion of the transport duct is minimized.

A further object is to provide an improved apparatus for charging finely divided solids into the transport gas stream as a plurality of thin screens of solids situated all around the periphery of the stream, including a plurality of coaxial rings having positioning lugs whereby the widths of the passages through which the solids flow can be simply and accurately controlled.

Still another object is to provide an improved method and apparatus for charging finely divided solids into a transport gas stream from an adjoining solids-feed chamber whereby a more complete control of the solids flow rate is achieved by control of the degree of fluidization within the solids-feed chamber.

In summary, according to the invention, regular and uniform mixing of the finely divided solids with the transport gas stream is achieved by a combination of steps wherein the solids are supplied to an annular bed which surrounds the stream of transport gas and in which the said solids are maintained in a fluidized state by admitting a fluidizing gas into the chamber, and the solids are charged into the outermost part of the stream of transport gas all around the periphery of the stream as one or more thin screens flowing in the general direction of the gas stream, i.e., the screens of solids enter the gas stream in the shape of essentially cylindrical currents or as currents that are frusta of cones having small apex angles, which screens may be peripherally continuous or interrupted.

The greatest improvement in the uniform pickup of the solids and reduction in duct erosion are attained when the solids enter the gas stream at the outer part thereof in flow directions approaching as closely as practicable the flow direction of the transport gas, so that they are not projected into the central part of the stream. Thus, while the invention, considered broadly, is applicable to entry of the solids with flow directions inclined up to 30° to the axis of the transport gas stream, marked improvement is achieved by using flow directions inclined less than 10° to the axis.

As regards the distribution of the solids, it is important that they be distributed uniformly all around the periphery of the transport gas stream and that, when the solids-inlet current is not peripherally continuous, the aggregate length of the several subcurrents nevertheless be a major part of the gas stream periphery. The entering current of solids need not, therefore, be circumferentially continuous; in fact, improved distribution of solids and mixing with the gas are attained by interrupting the entering current at short, regular intervals about the periphery of the gas stream, thereby forming the solids screen from an annular series of separate currents which spread out upon contact with the gas to become circumferentially substantially continuous. Moreover, it is desirable to provide a plurality of annular currents, each of which may be continuous or interrupted, situated at successive transverse planes along the axis of the transport gas stream, whereby the currents may be made thinner and the projection of the solids into the central part of the stream can be minimized.

By operating according to the method described above the pressure drop in the transport gas stream through the engagement device is reduced.

Improved control of the rate of solids flow into the transport gas stream is attained according to the invention by controlling the supply of fluidizing gas to the lower end of the annular bed within such a range of flow rates that the solids are completely fluidized to a height just above the level at which the solids are supplied to the stream of transport gas, but are incompletely fluidized above said height, withdrawing the fluidizing gas leaving said incompletely fluidized bed from the top thereof, and charging the solids into the gas stream as a constricted current of fixed size. Still further improved results are attained by admitting a controlled supply of supplemental fluidizing gas to the lower end of the incompletely fluidized part of the bed.

The apparatus for attaining improved mixing and reduced erosion according to the invention comprises a supply duct for the transport gas, usually vertical with the discharge end uppermost, a transport duct having the inlet end thereof disposed coaxially with the discharge end of the supply duct and in free communication therewith, a solids-inlet between the said ducts formed as one or more annular slots bounded by walls that are spaced apart radially to provide thin passages directed toward the transport duct at an angle less than 30° and, preferably, less than 10° to the duct axis, a feed and fluidization chamber surrounding parts of said duct at the said inlet means, means for admitting the solids to the said chamber situated either below or above the said inlet means, and means for admitting a fluidizing gas into the chamber at a level below the said inlet means.

The said annular slots may or may not be interrupted at peripherally spaced locations; improved distribution of solids is, however, usually attained by mounting short barriers in the slot at uniform intervals about the circumference. In a preferred embodiment the said slots are formed by a plurality of rings placed one above the other in coaxial relation between the supply and transport ducts, the latter duct preferably having a greater diameter than the former and rings having successively greater internal diameter to provide a gadually widening gas channel connecting the two ducts, each ring having a part thereof overlapping a part of the adjoining smaller ring in radially spaced relation to form the aforesaid annular passageway.

The apparatus for attaining improved control of the rate of solids flow from the feed chamber into the gas stream includes a solids-inlet opening to the gas duct situated at a level below the top of the feed and fluidization chamber, means for admitting finely divided solids to the chamber, means for admitting fluidizing gas into the said chamber at a level below said inlet opening and at such a rate that a bed of said finely divided solids can be established and maintained within said chamber, said bed being completely fluidized to a level just above the said solids-inlet opening and being incompletely fluidized above said level, and an outlet for discharging fluidizing gas from the upper part of said chamber above the said solids-inlet opening, e.g., at the extreme top thereof, whereby the rate of solids flow through the said solids-inlet opening can be controlled by varying the hydrostatic pressure of the fluidized bed at the entrance to the solids-inlet opening by changing the rate at which the fluidizing gas is supplied. Since the rate of solids flow from a fluidized bed is determined by the shape and size of the opening and the pressure drop through the opening, and since, moreover, the said opening and the pressure prevailing within the transport gas stream are fixed for any set of operating conditions, it is evident this variation of hydrostatic pressure permits variation of the rate at which the solids enter the transport gas stream. It is advantageous to provide additional means for admitting supplemental fluidizing air to the said chamber at a level above the solids-inlet opening at a controlled rate, whereby the pressure drop across the incompletely fluidized part of the bed and thus the pressure at the solids-inlet opening can be controlled more effectively.

The invention will be described further by reference to the accompanying drawings forming a part of this specification and illustrating certain preferred embodiments, wherein:

Figure 6 is a vertical sectional view of another modification of the engagement device;

Figure 7 is an enlarged detail view of a part of Figure 6;

Figure 8 is a fragmentary detail view, taken in vertical section, of a further modification of the engagement device;

Figure 9 is a vertical sectional view through still another embodiment of the engagement device;

Figure 10 is a fragmentary sectional view taken on the line 10—10 of Figure 9.

Figure 1:
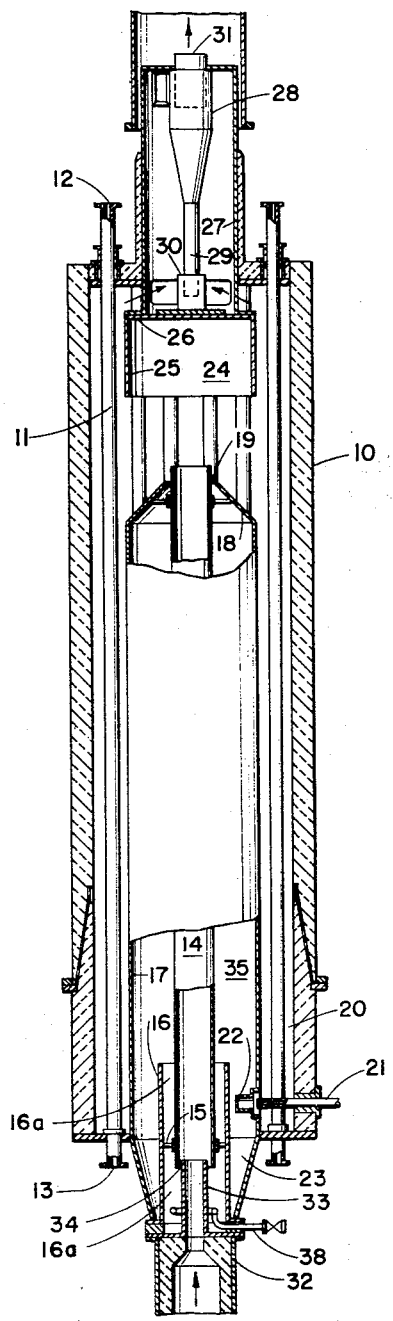
Figure 1 is a diagrammatic vertical sectional view through a fluidized bed furnace to which the invention is applied.
Figure 2:
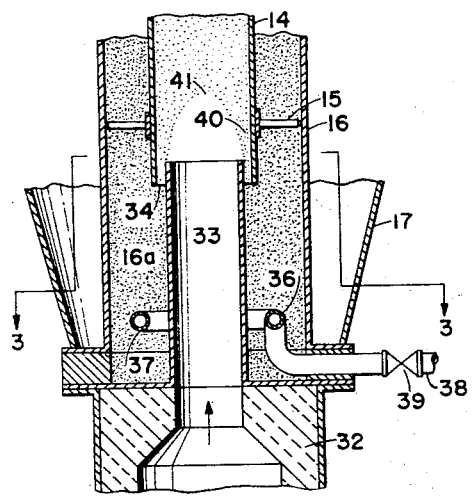
Figure 2 is a fragmentary detail view of a part of Figure 1, showing the engagement device.
Figure 3:
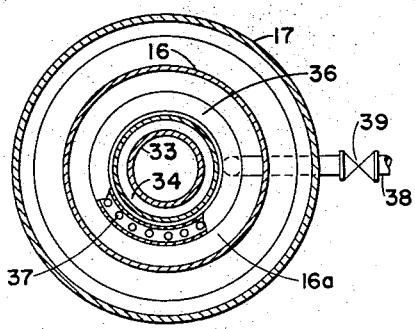
Figure 3 is a sectional view taken on the line 3—3 of Figure 2.

Figures 1-3 show the invention applied to a fluidized bed, circulating sand heater of the type described in greater detail in the aforementioned patent to Schoenmakers et al., to which reference may be made for additional details and variants. In summary, the heater includes thermally insulated column 10 containing near the wall thereof an annular series of vertical tubes 11 through which a process stream to be heated is flowed via inlets 12 at the tops and discharge outlets 13 at the bottoms. The central part of the column contains a transport riser duct 14 which is supported at the bottom by a spider 15 from a cylindrical wall 16 enclosing the feed and fluidization chamber 16a. Between the duct 14 and the tubes 11 is an annular partition wall 17 on top of which is a frustoconical section 18 extending to the duct 14 with a slight clearance 19 and the bottom of which extends frustoconically below the level of the column 10. Fluidizing gas can be admitted to the bottom of the annular space 20 which contains the tubes 11 through a plurality of radial pipes 21 having orifices at the bottom. One or more orifice metering nozzles 22 establish restricted communication between the space 20 and the well 23 between the wall 16 and the lower part of the wall 17. The top of the duct 14 opens into an enlarged disengagement space 24 containing at the top a cylindrical wall 25 joined to a circular plate 26. Above the column 10 and in communication therewith is a smaller, thermally insulated column 27 containing a separating device, such as a cyclone 28 from which solids are discharged at the bottom through a dipleg 29 extending into a seal cup 30 and gas is discharged at the top through an outlet 31. Hot combustion gases are provided by a burner having a combustion chamber 32.

The engagement device according to the invention includes a gas-supply duct 33 which receives the hot combustion gas as transport gas from the burner and has the upper, discharge end thereof disposed coaxially and in free communication with the lower, inlet end of the transport duct 14. The said discharge end is of slightly smaller diameter than and extends into the said inlet end to form a narrow, annular, solids-inlet passageway 34 which extends continuously all around the periphery of the transport duct. It will be noted that the feed and fluidization chamber 16a is, in this preferred embodiment, open at the top and in free communication with the annular space 35 between the duct 14 and the upper part of the wall 17. A distribution pipe 36, in the form of a torus having a plurality of orifices 37 at the bottom, is mounted within the chamber 16a below the level of the passageway 34 and is connected to a source of fluidizing gas by a pipe 38 having a flow-control valve 39.

In operation, the furnace is charged with a suitable quantity of finely divided, heat-retentive solids, such as graded sand having particle diameters falling within a narrow range, said range typically being a narrow part of the wider range 0.005 to 0.10 inch, and fluidizing gas, such as air, is admitted through the pipes 21 and 38. Hot combustion gases from the combustion chamber 32 are supplied as transport gas through the gas supply duct 33 at a velocity sufficient to entrain the sand, e.g., at 16 to 100 ft. per sec. The sand fills the well 23 to above the upper edge of the annular wall 16 and overflows the latter into the feed and fluidization chamber 16a to form an annular sand bed which is maintained as a dense, turbulent fluidized bed by the fluidizing gas emerging from the orifices 37. Normally, a part of this gas escapes from the top of the bed through the space 35 and clearance 19 into the space 24. Fluidization gives rise to a hydrostatic head in the bed, whereby the pressure within the bed at the level of the narrow, annular, solids-inlet passageway 34 exceeds that of the transport gas stream and the sand, together with at least a part of the fluidizing air, flows through said passageway with a flow direction essentially parallel to the axis of the gas stream to form a thin annular screen 40 of sand at the outer part of the gas stream. This gas is entrained by the transport gas to form a dilute transport phase, shown at 41, and is heated by the gas while ascending the duct. It was found that by thus forming a thin screen of sand wherein the sand is distributed all about the periphery of the transport gas stream, an intense mixing of the gas and sand occurs with a minimum of erosion of the transport duct. Moreover, the pressure drop in the transport gas stream is lower than when other methods of charging the solids are employed.

The transport phase emerges from the top of the duct 14 into the enlarged space 24, wherein the gas velocity is reduced, most of the sand being separated by impinging on the plate 26 and falling against the wall 18, which deflects the sand laterally into the top of the annular space 20. The gas, carrying a small amount of sand, flows around the wall 25, up through the column 27, and into the cyclone 28, wherein it is further freed from sand, and thereafter escapes through the outlet 31; separated sand descends through the dipleg 29 and cup 30 and flows around the wall 25 into the space 20. The sand descending the annular space 20 is fluidized by the gas admitted through the pipes 21 to form a dense, turbulent bed wherein the sand is in intimate contact with the tubes 11 to impart heat thereto. This fluidization further gives rise to a hydrostatic pressure at the bottom of the space 20, whereby the pressure there exceeds that within the space 35 and the sand flows through the metering nozzles 22 together with some gas at a rate determined by the sizes of the terminal orifices in the nozzles and by the said hydrostatic head. By this arrangement the sand is charged into the fluidized annular bed within the wall 16 at a controlled rate.

Under normal operating conditions, when there is no need for varying the rate at which the solids are supplied to the solids-inlet opening 34, the level of the bed present in the feed chamber 16a will be below the top of the cylindrical wall 16, and fluidizing gas is admitted through the pipe 38 at a rate sufficient to produce complete dense bed fluidization of the solids present in the annular feed chamber 16a. As the solids supplied to the chamber 16a will have to flow over the top of the cylindrical wall 16, there will exist a constant back pressure at the downstream side of the metering nozzles 22. Under these circumstances the rate at which the sand flows through the metering nozzles 22 will be constant and consequently the rate at which the sand is supplied to the gas duct will be constant. The metering nozzles 22 can be replaced with others to provide a desired flow and circulation rate of the sand. Thus, the height of the annular fluidized bed in chamber 16a determines the hydrostatic head at the entrance to the passageway 34, and that height will, for any given rate of sand supply, attain an equilibrium height; for example, if the height is, at any instant, below the equilibrium height, the rate of sand flow through the passageway 34 will be less than the rate of sand supply, until the bed height and hydrostatic head increase to equilibrium values. The maximum rate of sand circulation is attained when the bed height equals the height of the wall 16.

In addition to the above-mentioned stepwise control of the sand circulation rate, a continuous control thereof can be obtained by controlling the rate of gas admission through the pipe 38 by the flow control valve 39. When the rate at which this gas is admitted is decreased, a condition will be reached, at which that part of the bed present in the chamber 16a below a level just above the passageway 34 remains completely fluidized, but as the greater part of the fluidizing air supplied via the pipe 38 escapes together with the sand through the passageway 34, the remaining part of said air will be insufficient to completely fluidize that part of the bed located above the said level. Under these conditions the hydrostatic pressure at the entrance to the passageway 34 is dependent on the pressure drop across the incompletely fluidized part of the bed, which pressure drop is a function of the rate of gas flow through this incompletely fluidized bed as well as of the height thereof. Variation of this rate of gas flow by controlling the rate of gas supply through the pipe 38 within a range of flow rates in which the upper part of the annular bed is incompletely fluidized, thus results in a controlled hydrostatic pressure at the entrance to the passageway 34 and consequently in a controlled rate of sand flow through the passageway 34. As the pressure drop across the passageway 34 and consequently the sand circulation rate under these conditions will be less than during normal operation, the level in the chamber 16a will have to rise above the top of the cylindrical wall 16 into the space 35 so as to create an increased back pressure at the downstream side of the metering nozzles 22 until an equilibrium is reached at which the pressure drop across said metering nozzles is such that the rate of sand flow through said nozzles 22 due to the pressure drop thereacross, equals the rate of sand flow through the passageway 34.

It will be noted that in each of the above-mentioned cases the rate at which sand is charged into the transport gas stream is controlled by the hydrostatic pressure within the chamber 16a at the charging level.

Figure 4:
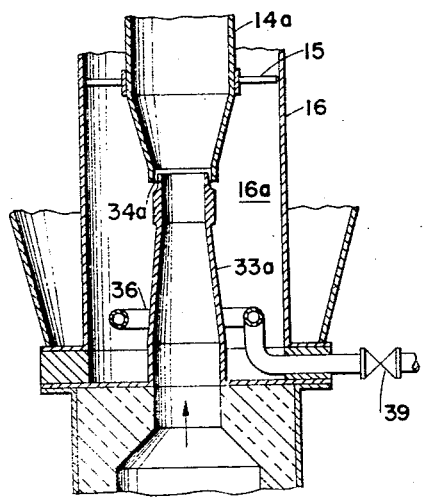
Figure 4 is a vertical sectional view of a modified construction of the engagement device.
Figure 5:
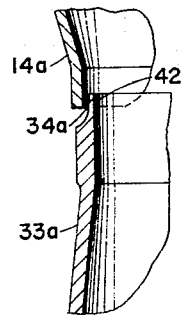
Figure 5 is an enlarged detail view of a part of Figure 4.

The shape and position of the slot 34 in Figures 1–3 is such that the sand screen 40 first extends along the inner wall of the transport riser duct 14. According to a modified construction, shown in Figures 4 and 5, the transport duct 14a is shaped to provide a constriction at the solids-inlet slot 34a, and the supply duct 33a has a thin lip 42 extending into the narrow part of the transport duct in radially spaced relation. The outer surface of this lip is shaped as a surface of revolution having a cross section which is outwardly concave and terminates at the top in a direction substantially parallel to the axis of the ducts but with a slight convergence, as shown. Solids in this case enter the transport gas stream at the outer part thereof along the surface of a cone having a very small apex angle. The divergence of the transport gas stream immediately beyond the slot 34a assists in the distribution of the solids throughout the stream. The apparatus operates in other respects in the same way as that according to Figures 1–3.

In the construction shown in Figures 6 and 7 the solids-inlet passageway comprises a plurality of annular slots 34b situated at different transverse planes spaced along the axis of the ducts. These slots are formed by mounting a series of rings 43 of successively greater internal diameters between the supply duct 33b and the transport duct 14b, to provide a central, gradually widening gas channel connecting the supply duct with the transport duct. Each ring has at the top thereof a thin lip 44 extending into the adjoining larger ring or, in the case of the uppermost ring, into the transport duct 14b in radially spaced relation, and the end of the supply duct 33b has a similar lip extending into the lowermost ring, the outer surface of each lip being shaped as described above for the lip 42 in the previous embodiment. The lower, inner edge of each ring and the lower edge of the transport duct 14b may be rounded as shown at 45. The several rings are supported in spaced relation by a plurality, e.g., three, supports 46 mounted on the supply duct 33b, which is in turn supported by a removable bottom closure 47, to provide an annular slot 34b between each pair of adjoining rings, between the lowermost ring and the supply duct 33b, and between the uppermost ring and the transport duct 14b. Because it is not desirable to load the rings 43 axially the transport duct 14b does not rest on the uppermost ring but is supported by the spider 15. By this arrangement the solids are charged in a plurality of thin screens into a diverging stream of transport gas, permitting thinner screens of solids to be used for a given rate of solids flow. In other respects operation is as was described above.

The rings can also be shaped frusto-conically as shown in Figure 8, wherein a series of rings 48 of identical size are mounted by a plurality of supports 46c between the supply duct 33c and the transport duct 14c. In this instance it is desirable to converge the slots 34c somewhat more toward the duct axis than in the previous embodiments; the solids flow direction should, however, not be directed too sharply toward the stream axis, the angle between the flow directions and the axis of the gas stream being less than 30°, and preferably less than 10°.

In the normal operation of the engagement devices (i.e. the operation at which the level of the fluidized bed present in the chamber 16a is below the top of the wall 16), it is sometimes found that the solids in the dense fluidized state are charged somewhat irregularly through the slots. This is due to the fact that the fluidizing gas supplied via the pipe 38 and distributor 36 escapes for the most part through the solids-inlet slots into the riser transport duct together with the granular material to be transported. As a result, too little fluidizing gas remains available to achieve effective fluidization of the material in the feed and fluidization chamber which is above the slots, so that the hydrostatic head fluctuates. This disadvantage can be overcome by the construction further illustrated in Figure 8 by supplying the fluidizing gas at two levels, i.e., by supplying the gas through the distributor 36 as previously described and by supplying supplemental fluidizing gas through an additional distributor 49 having orifices 50 at a level above the slots and provided with a gas supply pipe 51 and flow-control valve 52.

The fluidizing gas supplied to the distributor 49 through the pipe 51 keeps the granular or pulverulent material which is above the slots 34c in the dense fluidized state, while that supplied to the distributor 36 through the pipe 38 keeps the material below the slots in the dense fluidized state and, for the most part, flows together with this material into the riser transport duct 14c. It is evident that this method of supplying fluidizing gas at different levels can be applied also to the other embodiments shown.

Figure 11:
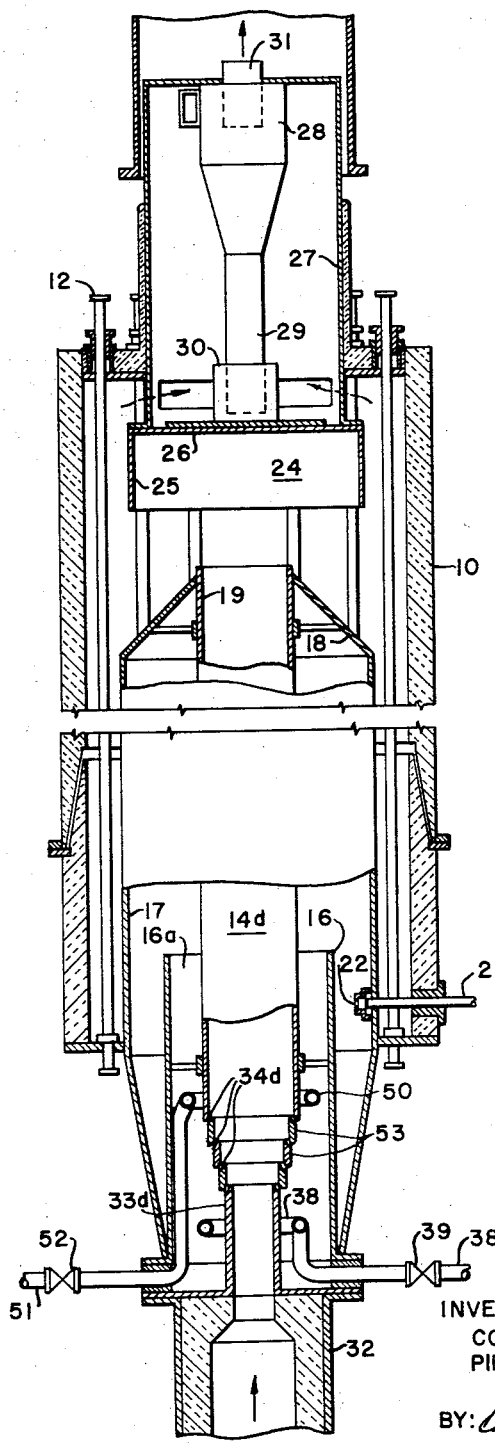
Figure 11 is a diagrammatic vertical sectional view through a fluidized bed furnace embodying the engagement device of Figures 9 and 10 and provided with the supplemental air admission means of Figure 8.

Improved distribution is obtained by interrupting the annular slots at regular intervals by narrow barriers. This construction is illustrated in Figures 9, 10 and 11, wherein the solids-inlet passageway is formed in part by a plurality of rings 53 of successively greater internal diameters, shaped as described above for the rings 43 but having a plurality of radial lugs 54 formed integrally on the outer surfaces of the thin lips 55, which extend in spaced relation into the adjoining rings of larger diameter or, in the case of the uppermost ring, into the transport duct 14d. The end of the supply duct 33d is formed with similar lip having lugs and extending in spaced relation into the lowermost ring. These lugs are spaced at uniform intervals about the circumference of each ring and constitute barriers to interrupt the annular slots 34d. Each lug has a short circumferential dimension, e.g., about equal to the radial extent of the slot 34d, as is seen in Figure 10, and the circumferential dimension of each lug is advantageously less than the intervening open part of the slot. Each lug has an outwardly directed face in engagement with the inner surface of the adjoining, overlapping ring, and a shoulder in engagement with the end of said adjoining ring, so as to position the said ring in proper relation. Because of this construction of the lugs the separate support means (46 and 46c of the previous embodiments) can be dispensed with.

In operation, the interrupted slots 34d function in the manner previously described for the slots 34b of Figures 6 and 7 with the difference that the solids enter at each interrupted slot 34d as an annular series of separate currents; these currents spread out circumferentially soon after coming into contact with the transport gas to form a screen of solids which is circumferentially substantially continuous.

In order to minimize the erosion of the transport duct, the velocity of the mixture in this duct should be as low as possible consistent with transport of the solids; this, however, increases the chance of fall-back of entrained solids. Such granular or pulverulent material which falls back may partially obstruct and clog the gas supply duct and the burner or other device which supplies the transport gas. This fall-back through the supply duct and the penetration of the solids to the burner or the like can be prevented by using a supply duct, the discharge end of which is smaller than the inlet end of the transport duct, as illustrated in all of the above embodiments. This expedient, of course, has no influence upon fallback through the transport duct. The solids-inlet opening, or at least one of the openings, when several slots are provided, should preferably be situated at the narrowest part of the transport stream, it having been found that a throat situated some distance upstream (i.e., below) from the slot often results in eddy currents which produce erosion.

As was already noted, the solids should be charged to the transport gas stream in a predominantly axial direction to the outermost or peripheral zone of the stream of transport gas, as in this zone the velocity of the gas is lowest; this technique, which is illustrated in all of the several embodiments, has the result that the loss of impact energy between the solids and the transport gas will be as small as possible. If it is required to transport larger quantities of solids it will be advantageous for the same reason to supply this material through a series of slots, as illustrated in Figures 6–11, whereby the thinner screens of solids make it possible to supply the solids mainly to the outermost zone of the gas stream.

We claim as our invention:

1. In a process of pneumatic transport of finely divided solids wherein a transport gas is flowed as a confined stream, said solids are supplied to an annular bed of said solids surrounding and isolated from said gas stream, and the solids are charged from said annular bed into said gas stream and entrained by the gas stream to form a dilute transport phase, the improvement which comprises: maintaining said annular bed in a dense, turbulent, fluidized state by admitting a fluidizing gas into said bed and charging the solids from the said fluidized bed in the fluidized state into said transport gas stream all around the periphery thereof as a plurality of thin annular screens situated at a corresponding plurality of zones spaced along said stream, the said screens flowing only at the outermost part of the gas stream in a direction close to that of the said stream, the radial thicknesses of said screens being small fractions of the radius of said gas stream.

2. Process according to claim 1 wherein said transport gas stream diverges between the points of entry into the gas stream of the first and last of said annular screens of solids.

3. In a process of pneumatic transport of finely divided solids wherein a transport gas is flowed as a substantially vertical, confined stream, said solids are supplied to an annular bed of said solids surrounding and isolated from said gas stream and the solids are charged from said annular bed into said gas stream and entrained by the gas stream to form a dilute transport phase, the improvement which comprises: admitting fluidizing gas to the lower end of the annular bed at such a rate that that part of the annular bed located below a level just above the level at which the solids are charged into said gas stream is maintained in a dense, turbulent, fluidized state and that that part of the annular bed located above said level is maintained in an incompletely fluidized state, thereby imposing a hydrostatic pressure on said lower part of the bed, discharging a part of said fluidizing gas from the top of said annular bed, charging the solids in the fluidized state together with another part of said fluidizing gas into said transport gas stream from an intermediate level of said fluidized bed higher than the level of admission of said fluidizing gas as at least one constricted current of fixed size, and controlling the rate of charge of solids from the completely fluidized part of the annular bed into the transport gas stream by varying the rate at which the fluidizing gas is admitted.

4. Process according to claim 3 wherein the control of the rate of charge of solids from the completely fluidized part of the annular bed into the transport gas stream, includes admitting a supplemental stream of fluidizing gas into said bed at a level above the said level at which the solids are charged into the transport gas stream.

5. Apparatus for the pneumatic transport of finely divided solids which comprises: a gas-supply duct for a transport gas stream, a transport duct having the inlet end thereof disposed coaxially with and in free communication with the discharge end of said supply duct, said supply and transport ducts providing therebetween a solids-inlet means including at least one pair of opposed walls spaced apart in the radial direction by a distance which is a small fraction of the radius of said supply duct and defining a narrow passageway which is situated all around and occupies the major part of the peripheries of said ducts and is directed toward the transport ducts at an angle less than 30° to the axis of the duct, a feed and fluidization chamber extending below and above the said solids-inlet means and including an enclosing wall surrounding said solids-inlet means, means for admitting finely divided solids to said chamber, and means for admitting a fluidizing gas to said chamber at a level beneath the said solids-inlet means.

6. Apparatus according to claim 5 wherein said narrow passageway is directed at an angle less than 10° to the axis of the transport duct.

7. In combination with the apparatus according to claim 5, additional means for admitting supplemental fluidizing gas into said chamber at a controlled rate at a level above the said solids-inlet means, said chamber having an outlet above the level of the said additional fluidizing gas inlet means.

8. Apparatus according to claim 5 wherein said narrow passageway is annular and interrupted by circumferentially narrow barriers situated at intervals spaced uniformly about the circumference of the passageway.

9. Apparatus according to claim 5 wherein said inlet means includes a plurality of pairs of radially spaced, opposed walls, each pair defining a narrow passageway situated and directed as specified in claim 8, said passageways being situated at a corresponding plurality of transverse planes spaced along the axis of said ducts.

10. Apparatus according to claim 9 wherein the internal diameter of the inlet end of said transport duct is greater than that of the discharge end of said supply duct and the said walls defining the narrow passageways have internal diameters that are progressively greater from the supply duct to the transport duct.

11. Apparatus according to claim 9 wherein the internal diameter of the inlet end of said transport duct is greater than that of the discharge end of said supply duct and the inner diameter of the passageway nearest the supply duct is substantially equal to the minimum diameter of the supply duct.

12. Apparatus according to claim 5 wherein the internal diameter of the inlet end of said transport duct is greater than that of the discharge end of said supply duct and said solids-inlet means includes a plurality of rings of successively greater internal diameters from the supply duct to the transport duct, said rings being mounted coaxially at successive transverse planes to define therein a gradually widening channel for said gas stream connecting the ends of said ducts, each ring having a part thereof extending over a part of the adjoining ring of smaller diameter in enveloping and spaced relation thereto to define therewith a narrow annular passageway situated and directed as defined in claim 8.

13. Apparatus according to claim 12 wherein said enveloped part of the adjoining ring is an annular lip at the radially inner part thereof extending toward and into the adjoining ring of greater diameter, the radially outer face of said lip being curved concavely in cross section terminating substantially in a direction parallel to the said axis and the internal surfaces of all said rings being essentially cylindrical.

14. Apparatus according to claim 13 wherein said lip has a plurality of integral positioning lugs, each lug providing a radially outwardly directed face in engagement with the inside of said enveloping part of the ring of greater diameter and a shoulder in engagement with the end of said enveloping part, said lugs being spaced uniformly about the periphery of the ring and having widths less than the peripheral intervals between adjacent lugs to subdivide said annular passageway into a plurality of sub-passageways.

15. Apparatus according to claim 5 wherein said solids-inlet means includes a plurality of rings mounted coaxially at successive transverse planes, each ring having an annular lip at the downstream end thereof, toward the transport duct, situated at the radially inner part thereof and a plurality of positioning lugs on the radially outer face of said lip spaced about the periphery, each lug providing an outwardly directed face and a shoulder set back from the end of the lip and directed toward said downstream end, each ring having further at the upstream end thereof a part enveloping the lip on the adjoining ring in spaced relation to define therewith a thin passageway situated all around the ring and interrupted by said lugs, said part of the ring being in engagement with the said outwardly directed face and shoulder of the lugs of said adjoining ring.

16. Apparatus for the pneumatic transport of finely divided solids at a controlled rate which comprises: duct means for a transport gas including coaxial gas supply and gas transport sections, at least one solids-inlet opening to said duct means between said sections thereof, said opening having a fixed size which is restricted in relation to the diameter of said duct a feed and fluidization chamber enclosing a portion of said duct means and extending below and above said inlet opening, means for admitting finely divided solids to said chamber, and means for admitting a fluidizing gas to said chamber at a controlled, variable rate at a level beneath the said solids-inlet opening, said chamber having an outlet situated above the level of said solids-inlet opening for the discharge of fluidizing gas.

17. In combination with the apparatus according to claim 16, additional means for admitting supplemental fluidizing gas into said chamber at a controlled rate at a level above said solids-inlet opening.

References Cited in the file of this patent

UNITED STATES PATENTS

| | | |
|---|---|---|
| 1,364,532 | Von Porat | Jan. 4, 1921 |
| 2,662,796 | Shabaker | Dec. 15, 1953 |
| 2,668,755 | Kershaw | Feb. 9, 1954 |
| 2,699,363 | Weinrich | Jan. 11, 1955 |
| 2,711,386 | Delaplaine | June 21, 1955 |
| 2,726,122 | Hagerbaumer | Dec. 6, 1955 |
| 2,758,564 | Randall | Aug. 14, 1956 |
| 2,772,122 | Hall | Nov. 27, 1956 |
| 2,805,899 | Bearer | Sept. 10, 1957 |
| 2,809,023 | Schoenmakers | Oct. 8, 1957 |